US010019831B2

(12) United States Patent
Champion et al.

(10) Patent No.: US 10,019,831 B2
(45) Date of Patent: Jul. 10, 2018

(54) INTEGRATING REAL WORLD CONDITIONS INTO VIRTUAL IMAGERY

(71) Applicant: zSpace, Inc., Sunnyvale, CA (US)

(72) Inventors: Clifford S. Champion, San Jose, CA (US); Jerome C. Tu, Saratoga, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

(21) Appl. No.: 15/298,956

(22) Filed: Oct. 20, 2016

(65) Prior Publication Data

US 2018/0114353 A1 Apr. 26, 2018

(51) Int. Cl.
| | |
|---|---|
| *G06T 15/00* | (2011.01) |
| *G06T 19/00* | (2011.01) |
| *H04N 13/04* | (2006.01) |
| *G06T 17/20* | (2006.01) |
| *G06T 15/10* | (2011.01) |
| *G06T 17/00* | (2006.01) |

(52) U.S. Cl.
CPC .......... *G06T 15/005* (2013.01); *G06T 19/006* (2013.01); *H04N 13/044* (2013.01); *G06T 15/00* (2013.01); *G06T 15/10* (2013.01); *G06T 17/00* (2013.01); *G06T 17/20* (2013.01); *G06T 19/00* (2013.01)

(58) Field of Classification Search
CPC ..... G06T 15/005; G06T 19/006; G06T 19/00; G06T 17/20; G06T 17/00; G06T 15/10; G06T 15/00; H04N 13/044
See application file for complete search history.

(56) References Cited

U.S. PATENT DOCUMENTS

| | | | | |
|---|---|---|---|---|
| 6,064,354 | A | * | 5/2000 | DeLuca ................ G02B 27/22 345/419 |
| 6,774,869 | B2 | | 8/2004 | Biocca et al. |
| 7,812,815 | B2 | | 10/2010 | Banerjee et al. |
| 8,643,569 | B2 | * | 2/2014 | Vesely .................... G06F 3/011 345/156 |
| 9,432,421 | B1 | * | 8/2016 | Mott ..................... H04W 4/025 |
| 2003/0067536 | A1 | * | 4/2003 | Boulanger ............... H04N 7/15 348/14.08 |
| 2003/0231174 | A1 | * | 12/2003 | Matusik .................. G06T 9/001 345/419 |
| 2007/0132721 | A1 | * | 6/2007 | Glomski ................ G06F 3/011 345/156 |

(Continued)

*Primary Examiner* — Abderrahim Merouan

(74) *Attorney, Agent, or Firm* — Meyertons Hood Kivlin Kowert & Goetzel, P.C.; Jeffrey C. Hood; Brian E. Moore

(57) ABSTRACT

Systems and methods for incorporating real world conditions into a three-dimensional (3D) graphics object are described herein. In some embodiments, images of a physical location of a user of a three-dimensional (3D) display system may be received from at least one camera and a data imagery map of the physical location may be determined based at least in part on the received images. The data imagery map may capture real world conditions associated with the physical location of the user. Instructions to render a 3D graphics object may be generated and the data imagery map may be incorporated into a virtual 3D scene comprising the 3D graphics object, thereby incorporating the real world conditions into virtual world imagery. In some embodiments, the data imagery may include a light map, a sparse light field, and/or a depth map of the physical location.

20 Claims, 14 Drawing Sheets

(56) References Cited

U.S. PATENT DOCUMENTS

| | | | |
|---|---|---|---|
| 2010/0073454 A1* | 3/2010 | Lovhaugen | G06F 3/0486 348/14.03 |
| 2010/0182340 A1 | 7/2010 | Bachelder et al. | |
| 2011/0107270 A1* | 5/2011 | Wang | G06F 19/3437 715/850 |
| 2013/0010260 A1* | 1/2013 | Tumlinson | A61B 3/152 351/206 |
| 2014/0125668 A1* | 5/2014 | Steed | G06T 15/50 345/426 |
| 2014/0192164 A1* | 7/2014 | Tenn | H04N 13/0242 348/47 |
| 2014/0327690 A1* | 11/2014 | McGuire | A63F 13/355 345/589 |
| 2015/0301592 A1* | 10/2015 | Miller | G06F 3/011 345/156 |
| 2015/0302645 A1* | 10/2015 | Takeuchi | G01C 21/3602 345/633 |
| 2016/0026253 A1* | 1/2016 | Bradski | G02B 27/225 345/8 |
| 2016/0210785 A1* | 7/2016 | Balachandreswaran | G02B 27/017 |
| 2016/0292924 A1* | 10/2016 | Balachandreswaran | G06T 19/006 |
| 2017/0289762 A1* | 10/2017 | Cudalbu | H04W 4/023 |

* cited by examiner

INTEGRATING REAL WORLD CONDITIONS INTO VIRTUAL IMAGERY

TECHNICAL FIELD

This disclosure relates to the field of digital display and more particularly to methods and systems for integrating physical conditions into imagery presented by a three-dimensional (3D) system.

DESCRIPTION OF THE RELATED ART

Three-dimensional (3D) displays (actually, simulated 3D, e.g., via stereoscopic display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8-bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255. This component may also scale an image from the input resolution to a different, rendered resolution supported by the display.

3. Panel—This component is the display itself, typically a liquid crystal display (LCD), though other displays are possible, and takes as input the video levels (e.g., for R, G and B) output from the scaler for each pixel, and converts the video levels to voltages, which are then delivered to each pixel on the display. The panel itself may modify the video levels before converting them to voltages.

The video chain generally modifies the video levels in two ways, specifically gamma correction and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal (i.e., monoscopic) display, in a stereo display, there are two images for each video frame: right and left. The right image must be delivered to only an observer's right eye, and the left image must be delivered to only the observer's left eye. In a time sequential stereo display, this separation of right and left images is performed in time, i.e., the left and right images are presented sequentially, and thus, contains some time-dependent element which separates these two images. There are two common architectures for stereo displays.

The first architecture uses a device called a polarization switch (PS), which may be a distinct (i.e., separate) or integrated LC device or other technology switch and which is placed in front of the LCD panel (or any other type of imaging panel, such as an OLED (organic light emitting diode) panel, a plasma display, etc.) or any other pixelated panel display used in a time-sequential stereo imaging system. Specifically, the PS switch may be placed between the display panel and the viewer, as shown in FIG. 2A. The purpose of the PS is to switch the light transmitted from the display panel between two orthogonal polarization states. For example, one of these states may be horizontally linearly polarized light (i.e., the light may be in a horizontal linear polarization state), and the other may be vertically linearly polarized light (i.e., the light may be in a vertical linear polarization state); however, other options are possible (e.g., left and right circular polarization states, etc.). The key feature that allows the PS to deliver the correct image to the correct eye of the viewer (i.e., the left image to the left eye and the right image to the right eye) is that the two polarization states are orthogonal to each other.

This architecture allows achievement of the stereo effect shown in prior art FIG. 2B. As may be seen, the top portion of the figure shows the (display) panel switching between a left image and a right image. Synchronous with the panel switching, the PS is switching the light being transmitted between a left state and a right state, as shown. These two states emit two corresponding orthogonal polarization states, as explained above. As FIG. 2B further shows, the system includes stereoscopic eyewear that is designed such that the left lens will only pass the left state polarization and the right lens will only pass the right state polarization. In this way, separation of the right and left images is achieved.

The second conventional architecture uses stereoscopic shutter glasses, which replace (or integrate the functionality of) the PS and eyewear. In such systems, each eye is covered by an optical shutter, which can be either open or closed. Each of these shutters is cycled between opened and closed synchronously with the display panel in such a way that when the left image is shown on the display, only the left eye shutter is open, and when the right image is shown on the display, only the right eye shutter is open. In this manner, the left and right views are alternatingly presented to the user's left and right eye, respectively. The alternate presentation of left and right views to the user's left and right eyes creates the perception of visual depth, as shown in FIG. 4. Virtual objects may be displayed in this created 3D space, which exists both above the 3D stereoscopic display panel (i.e., negative space) and below the stereoscopic display panel (i.e., positive space).

SUMMARY

Various embodiments of a system for implementing methods for integrating real world (e.g., physical) conditions into imagery presented by a three-dimensional (3D) display system. The system may include one or more displays and at least one processor coupled to the one or more displays. In some embodiments, the one or more displays and at least one processor may be comprised in a head-mounted display system. In some embodiments, the system may further include a stylus communicatively coupled to the at least one processor and a memory coupled to the at least one processor. The processor may be configured to perform or implement embodiments of the techniques disclosed herein. Additionally, a method implementing embodiments of the techniques may be implemented on a computer or stored as program instructions on a computer readable memory medium.

In some embodiments, images of a physical location of a user of a three-dimensional (3D) display system may be received from at least one camera and a data imagery map of the physical location may be determined based at least in part on the received images. The data imagery map may capture real world conditions associated with the physical location of the user. Instructions to render a 3D graphics object may be generated and the data imagery map may be incorporated into a virtual 3D scene comprising the 3D graphics object, thereby incorporating the real world conditions into virtual world imagery. In some embodiments, the data imagery may include a light map of the physical location and/or a sparse light field of the physical location.

BRIEF DESCRIPTION OF THE DRAWINGS

A better understanding of the present disclosure can be obtained when the following detailed description of the preferred embodiment is considered in conjunction with the following drawings, in which.

Figure 1:
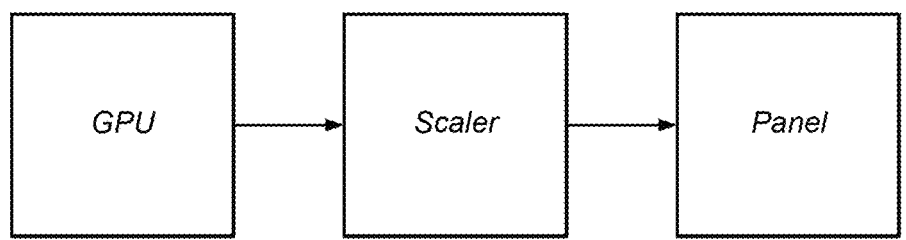
FIG. 1 illustrates a modern display chain, according to the prior art.
Figure 2A:
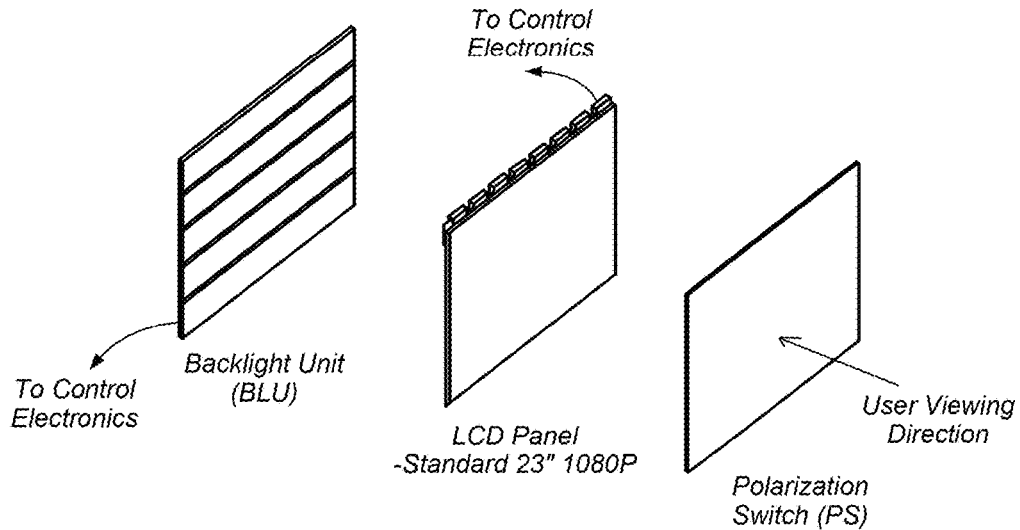
FIG. 2A illustrates an example of an architecture that utilizes a polarization switch, according to the prior art.
Figure 2B:
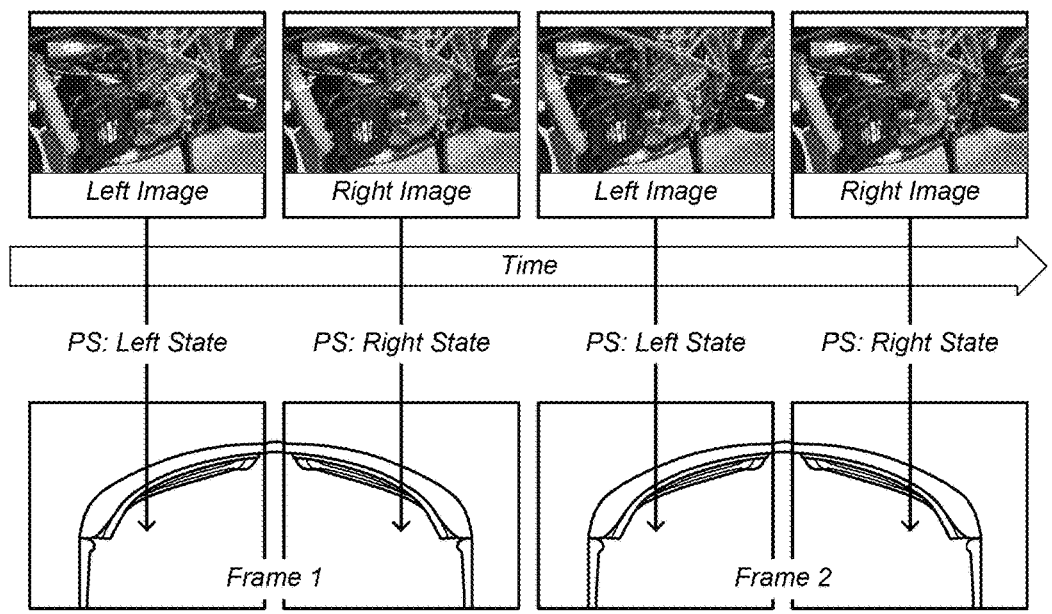
FIG. 2B illustrates an example of a stereo effect (simulated 3D) using polarization switching between left and right views, according to the prior art.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, server, graphics server, or equivalent, and outputs video levels for each color or channel of a supported color model, e.g., for each of three colors, typically Red (R), Green (G), and Blue (B), for each pixel on the display. Each of these numbers is typically an 8-bit number, with a range of 0 to 255, although other ranges are possible.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element (or Functional Unit)—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Figure 4:
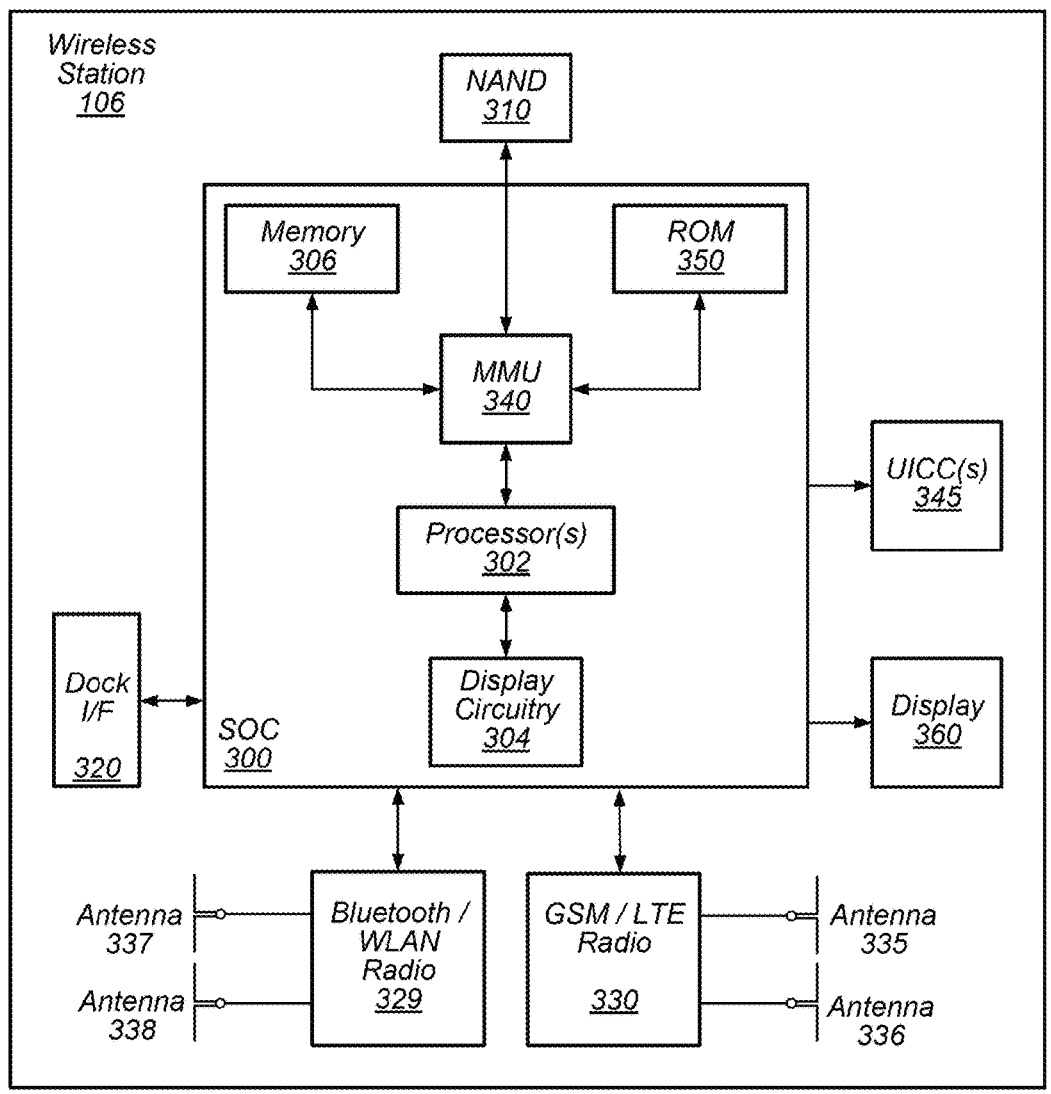
FIG. 4 illustrates an example block diagram of a user equipment device configured according to some embodiments.

Coupled Zone—refers to a physical volume in which the user of a 3D stereoscopic display can view 3D content within the human eye's natural depth of field. As shown in FIG. 4, when a person sees an object in the physical world, the person's eyes converge on, or look (individually aim) at, the object. Additionally, as the two eyes converge on the object, each eye's lens also focuses, via accommodation, (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers the display of a 3D object, or content, on a two-dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—refers to or specifies a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking system (which may identify and track, among other things, the user's view) may identify the position/orientation of the user's view, and this information may then be correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as 89 or 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective effect rendered from a viewpoint which is not perpendicular to the display surface. More particularly, the term "horizontal perspective" may typically refer to a perspective effect which is rendered using a substantially 45-degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z (i.e., location) coordinates within a defined space. The position may be relative or absolute, as desired. Position may also include yaw, pitch, and roll information, e.g., when defining the orientation of a viewpoint. In other words, position is defined broadly so as to encompass information regarding both location and orientation.

Stylus—a peripheral device or element such as a handheld device, handheld pen device, handheld pointing device, hand, finger, glove, or any object used to directly interact with rendered virtual objects as in a stereo rendered virtual projected objects.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be rescaled, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Proximate—near to; for example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including."". As used in the appended claims, this term does not foreclose additional elements, structure, or steps. Consider a claim that recites: "A system comprising a display . . . "; such a claim does not foreclose the system from including additional components (e.g., a voltage source, a light source, etc.).

Configured to—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

In other words, various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

In addition, various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1. In other words, the headings used herein are for organizational purposes only and are not meant to be used to limit the scope of the description.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification may include references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIGS. 3-6 Exemplary Systems

Figure 3:
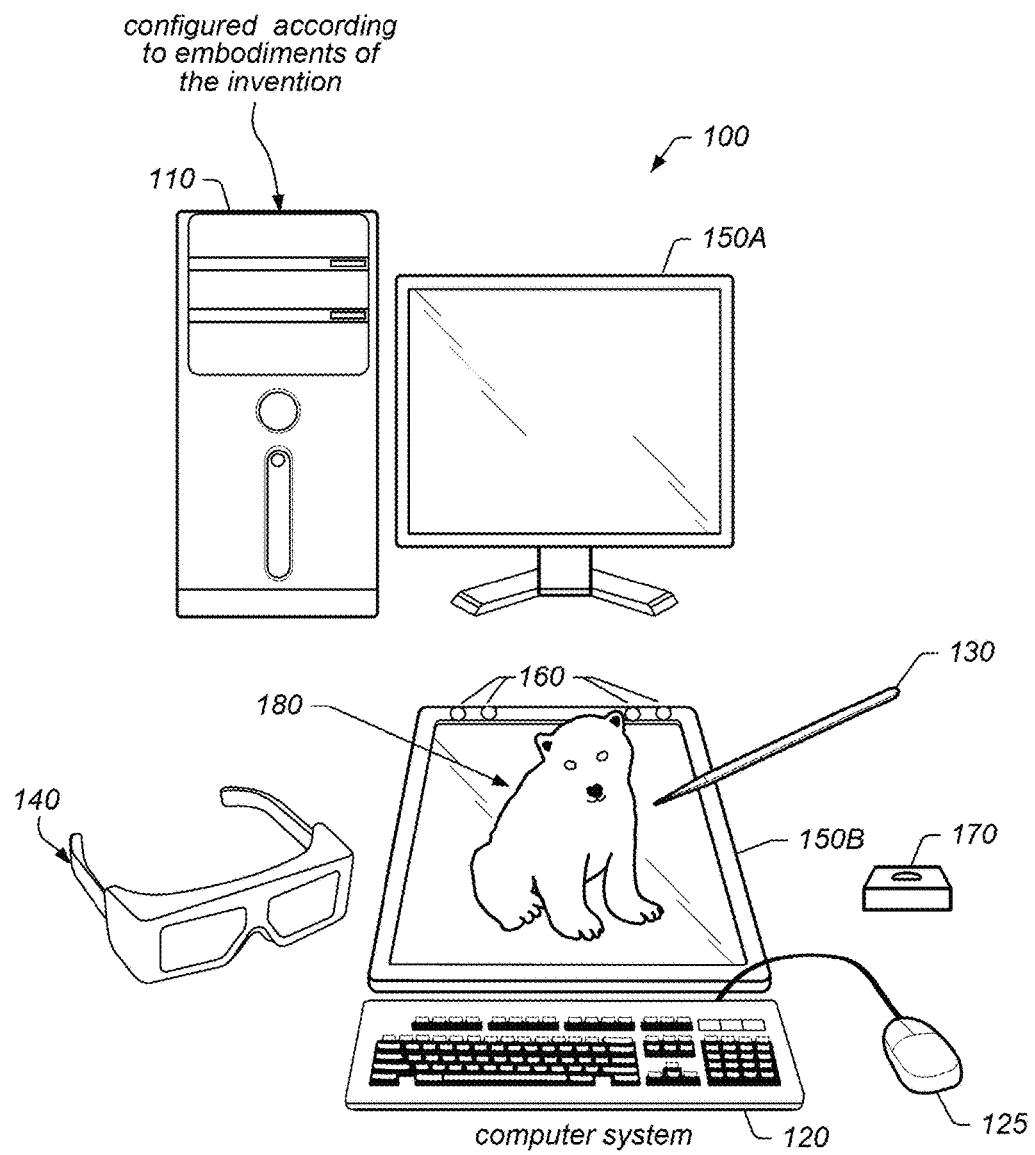
FIG. 3 illustrates an example 3D stereoscopic display system configured according to some embodiments.

FIG. 3 illustrates an exemplary system configured to implement various embodiments of the techniques described below.

In the exemplary embodiment of FIG. 3, computer system 100 may include chassis 110, display 150A and display 150B (which may collectively be referred to as display 150 or "one or more displays" 150), keyboard 120, mouse 125, user input device 130, eyewear 140, at least two cameras 160, and caddy 1100. Note that in some embodiments, two displays 150A and 150B may not be used; instead, for example, a single display 150 may be used. In various embodiments, at least one of the displays 150A and 150B may be a stereoscopic display. For example, in some embodiments, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three-dimensional (3D) scene (e.g., via stereoscopic images), or 3D content, such as scene 180, using the display 150A and/or the display 150B. The computer system 100 may also be configured to display a "view" of the 3D scene using the display 150A, the display 150B, and/or another display, as described in more detail below. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of Figure is exemplary only, and other numbers of displays are also envisioned. For example, the computer system 100 may include only a single display or more than two displays, or the displays may be arranged in different manners than shown, e.g., as goggles or other wearable eyewear or headgear as further described below in reference to FIG. 5. In this particular embodiment, the display 150A is configured as a vertical display (which may be perpendicular or approximately perpendicular to a user's line of sight) and the display 150B is configured as a horizontal display (which may be parallel (or approximately parallel) or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images that are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others. In some embodiments, the display(s) 150 may be included (or incorporated) in the eyewear (or other wearable headgear). In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two-dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In some embodiments, eyewear 140 may be used as a position input device to track the user view (e.g., eyepoint or point of view (POV)) of a user viewing a 3D scene presented by the system 100. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display(s) 150 and the point of view of the user may be used to map a portion of the virtual space to the physical space of the system 100. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100 may include one or more sensors 160. The one or more sensors 160 may be included in a tracking system. FIG. 3 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100, track a user's movement, or track a user's head or eyes, among other contemplated functions. In some embodiments, cameras 160 may track a position and/or an orientation of user input device 130. The information regarding the position (including the orientation) of the user input device 130 provided by the one or more sensors 160 may be used in conjunction with other positional information of the system (e.g., an accelerometer and/or gyroscope within the stylus itself) to perform more precise 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100 may also include a caddy 1100 to store user input device 130. Caddy 1100 may also be used to calibrate the orientation of the stylus to a known roll, pitch, and yaw, and so may be in a fixed position relative to cameras 160.

In some embodiments, the system 100 may be configured to couple to a network, such as a wide area network, via an input. The input may be configured to receive data (e.g., image data, video data, audio data, etc.) over the network from a system similar to system 100. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6 DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110 to determine a position or a POV, e.g., via execution of one more programs by or on a processor or functional unit of chassis 110, although in other embodiments the tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a tracking system at a remote location. The information regarding the POV may indicate a position of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110 may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110.

Thus, the system 100 may present a 3D scene with which the user may interact in real time. The system may include real-time electronic display(s) 150 that may present or convey perspective images in the open space, and user input device 130 that may allow the user to interact with the 3D scene with hand controlled or hand-held tools. The system 100 may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100 is shown as including horizontal display 150B because it simulates the user's visual experience with the horizontal ground, other viewing surfaces may offer similar 3D illusion experiences. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100) may be used as desired.

According to various embodiments of the present disclosure, the display module 230 may display various types of information (for example, multimedia data or text data) to be provided to the user. The display module 230 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display module 230 may be connected functionally to an element(s) of the electronic device. Also, the display module 230 may be connected functionally to an electronic device(s) other than the electronic device. According to various embodiments of the present disclosure, the input module 240 may receive an input for controlling an attribute of, for example, a history screen. The input module 240 may receive, for example, an input of 'reference screen setting'. 'Reference screen setting' may involve an operation for storing information related to the screen in the storage module 210 in order to display the reference screen. The input module 240 may receive, for example, an input for displaying the reference screen. Attributes of the screen may include, for example, at least one of the position of the reference screen, a sound volume for the reference screen, brightness of the screen, and the size of the screen. If the input module 240 is included in a second electronic device, the input module 240 may not be provided in the electronic device according to various embodiments of the present disclosure.

FIG. 4 illustrates an example simplified block diagram of a wireless station 106. According to embodiments, wireless station 106 may be a user equipment (UE) device, a mobile device and/or mobile station. Wireless station 106 may be used in conjunction with the system described above in reference to FIG. 4 and the systems described below in reference to FIGS. 5B and 5C. For example, wireless station 106 may be configured as an input device to any of the described systems (e.g., wireless station 106 may be configured as a user input device). As another example, according to some embodiments, wireless station 106 may be configured as a display of any of the described systems. Thus, wireless station 106 may be configured to display a stereoscopic image. In some embodiments, wireless station 106 may be configured to communicate with a 3D system either wirelessly (e.g., via a local area network such as a Wi-Fi, Bluetooth, or Bluetooth low energy connection) or via a wired interface such as a universal serial bus interface, among other wired interfaces.

As shown, the wireless station 106 may include a system on chip (SOC) 300, which may include portions for various purposes. The SOC 300 may be coupled to various other circuits of the wireless station 106. For example, the wireless station 106 may include various types of memory (e.g., including NAND flash 310), a connector interface (I/F) (or dock) 320 (e.g., for coupling to a computer system such as a 3D system, dock, charging station, etc.), the display 360 (which, in some embodiments, may be configured to display stereoscopic images), cellular communication circuitry 330 such as for LTE, GSM, etc., and short to medium range wireless communication circuitry 329 (e.g., Bluetooth™ and WLAN circuitry). The wireless station 106 may further include one or more smart cards that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the wireless station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As described herein, the wireless station 106 may include hardware and software components for implementing the features described herein, e.g., the wireless station 106 may form at least part of a 3D display system such as system 100 described above and/or systems 500A and 5B described below. For example, the processor 302 of the wireless station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Figure 5A:
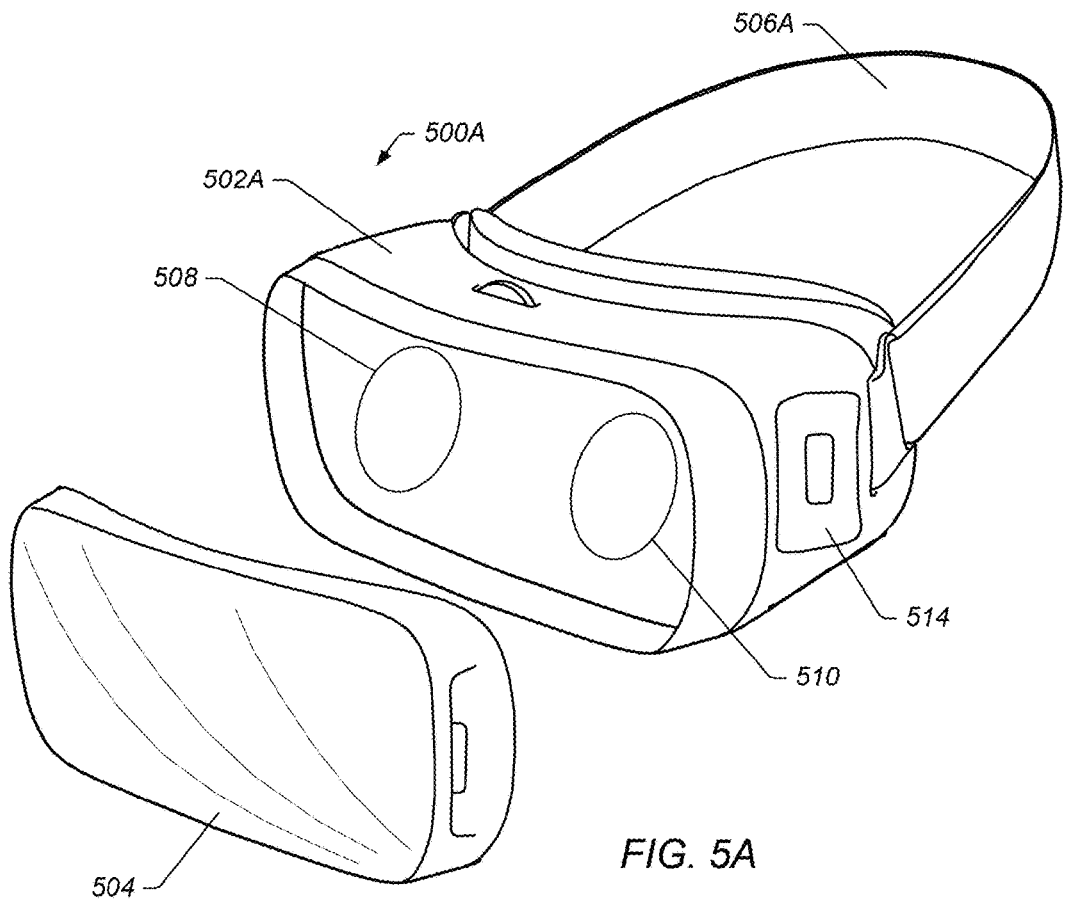
FIGS. 5A and 5B illustrate examples of a 3D head-mounted stereoscopic display system configured according to some embodiments.

Referring to FIG. 5A, a head-mounted electronic device 500A may include a body 502A and a cover 504. The body 502 may include lenses 508 and 510, and a control device 514. In addition, electronic device 500A may include a support 506A which may be configured to support electronic device 500A on a user's head. Lenses 508 and 510 may be positioned to correspond to eyes of a user. The user may view a screen on a display through lenses 508 and 510. The display may be coupled or connected to electronic device 500. In some embodiments, the display may be included on (or in) cover 504 and cover 504 may be configured to couple to body 502A. In some embodiments, electronic device 500A may include a display, such as display 150A or 150B described above in reference to FIG. 4. Thus, cover 504 may be communicatively coupled to body 502A (e.g., to couple a display of cover 504 to a processor of electronic device 500) and mechanically coupled (e.g., attached to) body 502. In some embodiments, the communicative coupling between body 502A and cover 504 may be wired and/or wireless.

In some embodiments, control device 514 may be located on a side surface of body 502A. Control device 514 may be used for the user to enter an input for controlling the head-mounted electronic device 500A. For example, control device 514 may include a touch panel, a button, a wheel key, and/or a touch pad. The touch panel may receive the user's touch input. The touch input may be a direct touch input to the touch panel or a hovering input in the vicinity of the touch panel.

In some embodiments, head-mounted electronic device 500A may include or be in communication with one or more external cameras, such as cameras 750 further described below. For example, head-mounted electronic device 500A may include (or be in communication with) one or more cameras (or an array of cameras) that may be configured to capture images of a physical location of a user and incorporate those images as further described below. In other words, the one or more cameras may be configured and positioned such that up to a 360-degree view of the physical location (or a portion of the physical location) of the user may be obtained.

Figure 5B:
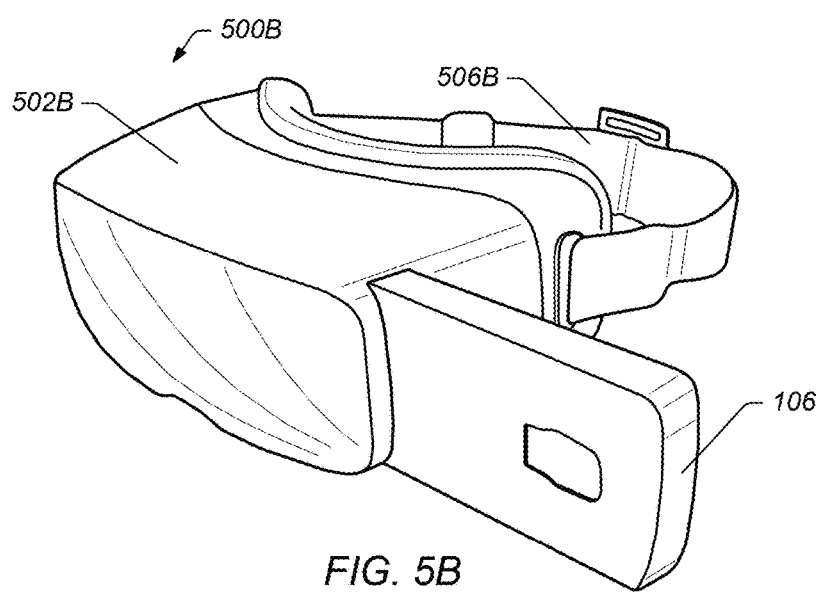

Turning to FIG. 5B, a head-mounted electronic device 500B may include a body 502B and a support 506B. Body 502B may be configured to couple to a wireless station and a display of electronic device 500B may be a display of a wireless station, such as wireless station 106, and the wireless station may be coupled or connected to (e.g., may be detachably mounted to) electronic device 500B. In other words, electronic device 500B may be configured such that a wireless station may be non-permanently coupled to, and removable without destructive measures, to electronic device 500B. Thus, electronic device 500B may be coupled to and decoupled from (e.g., non-destructively decoupled from) a wireless station without a change in functionality of the wireless station or electronic device 500B. In some embodiments, head-mounted electronic device 500B may include or be in communication with one or more cameras, such as cameras 750 further described below. For example, head-mounted electronic device 500B may include (or be in communication with) one or more cameras (or an array of cameras) that may be configured to capture images of a physical location of a user and incorporate those images as further described below. In other words, the one or more cameras may be configured and positioned such that up to a 360-degree view of the physical location (or a portion of the physical location) of the user may be obtained.

Figure 5C:
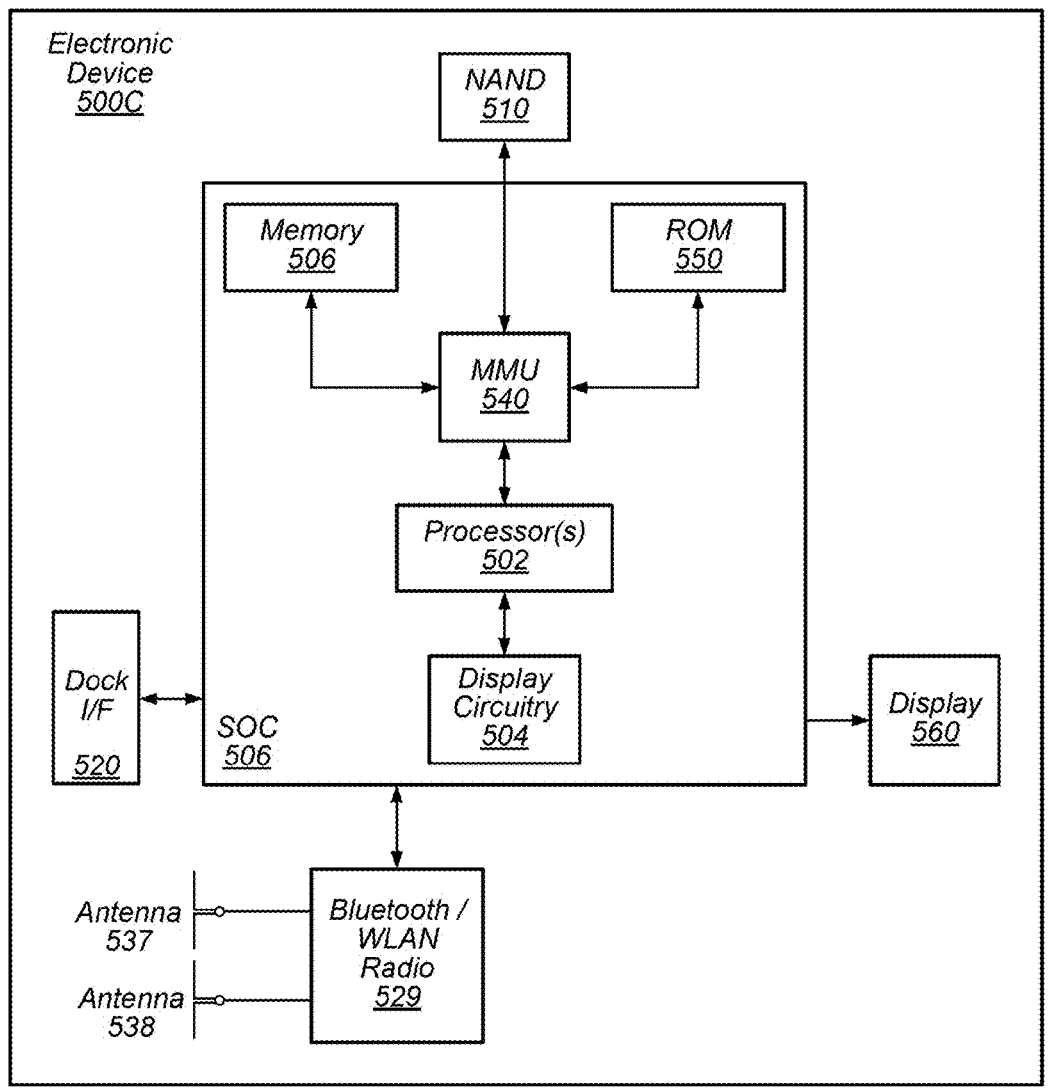
FIG. 5C illustrates an example block diagram of a head-mounted electronic device configured according to some embodiments.

Turning to FIG. 5C, FIG. 5C illustrates an example simplified block diagram of a head-mounted electronic device 500C. According to embodiments, electronic device 500C may be include a display (e.g., such as electronic device 500A) or may be configured to couple to wireless station (e.g., such as electronic device 500B). Note that electronic devices 500A and 500B described above may include at least portions of the features described in reference to electronic device 500C.

As shown, the electronic device 500C may include a system on chip (SOC) 506, which may include portions for various purposes. The SOC 506 may be coupled to various other circuits of the electronic device 500C. For example, the electronic device 500C may include various types of memory (e.g., including NAND flash 510), a connector interface (I/F) (or dock) 520 (e.g., for coupling to a computer system, dock, charging station, external display, etc.), the display 560 (note that is some embodiments, electronic device 500C may not include display 560), and short to medium range wireless communication circuitry 529 (e.g., Bluetooth™ and WLAN circuitry). The short to medium range wireless communication circuitry 529 may also couple to one or more antennas, such as antennas 537 and 538 as shown. The short to medium range wireless communication circuitry 529 may include multiple receive chains and/or multiple transmit chains for receiving and/or transmitting multiple spatial streams, such as in a multiple-input multiple output (MIMO) configuration.

As shown, the SOC 506 may include processor(s) 502, which may execute program instructions for the electronic device 500C and display circuitry 504, which may perform graphics processing and provide display signals to the display 560 (and/or to dock 520). The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, short range wireless communication circuitry 529, connector interface (I/F) 520, and/or display 560. The MMU 540 may be configured to perform memory protection and page table translation or set up. In some embodiments, the MMU 540 may be included as a portion of the processor(s) 502.

In some embodiments, electronic device 500C (and/or an electronic device such as electronic device 500A or 500B) may be in communication with a user input device, such as user input device 130 described above. In some embodiments, the electronic device may receive user input via user input device 130 as described above.

In addition, in some embodiments, electronic device 500C may include one or more positional sensors such as accelerometers, gyroscopic sensors, geomagnetic sensors, magnetic sensors, proximity sensors, gesture sensors, grip sensors, and/or biometric sensors. In some embodiments, the electronic device may acquire information for determining a motion of a user wearing the electronic device and/or whether a user wears or removes electronic device 500C, using the one or more positional sensors. The at least one processor may control execution of a function(s) or an operation(s) corresponding to an input received through a control device (for example, control device 514 and/or user input device 130) in response to a received input.

In some embodiments, electronic device 500C may include or be in communication with one or more external cameras, such as cameras 750 further described below. For example, electronic device 500C may include (or be in communication with) one or more cameras (or an array of cameras) that may be configured to capture images of a physical location of a user and incorporate those images as further described below. In other words, the one or more cameras may be configured and positioned such that up to a 360-degree view of the physical location (or a portion of the physical location) of the user may be obtained.

As described herein, the electronic device 500C may include hardware and software components for implementing the features described herein, e.g., the electronic device 500C may form at least part of a 3D display system such as system 100 described above and/or systems 500A and 5B described below. For example, the processor 502 of the electronic device 500C may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition), the processor 502 of the UE 106, in conjunction with one or more of the other components 500, 504, 506, 510, 520, 535, 550, 560 may be configured to implement part or all of the features described herein.

In addition, as described herein, processor 502 may include one or more processing elements. Thus, processor 502 may include one or more integrated circuits (ICs) that are configured to perform the functions of processor 502. In addition, each integrated circuit may include circuitry (e.g., first circuitry, second circuitry, etc.) configured to perform the functions of processor(s) 502.

Figure 6:
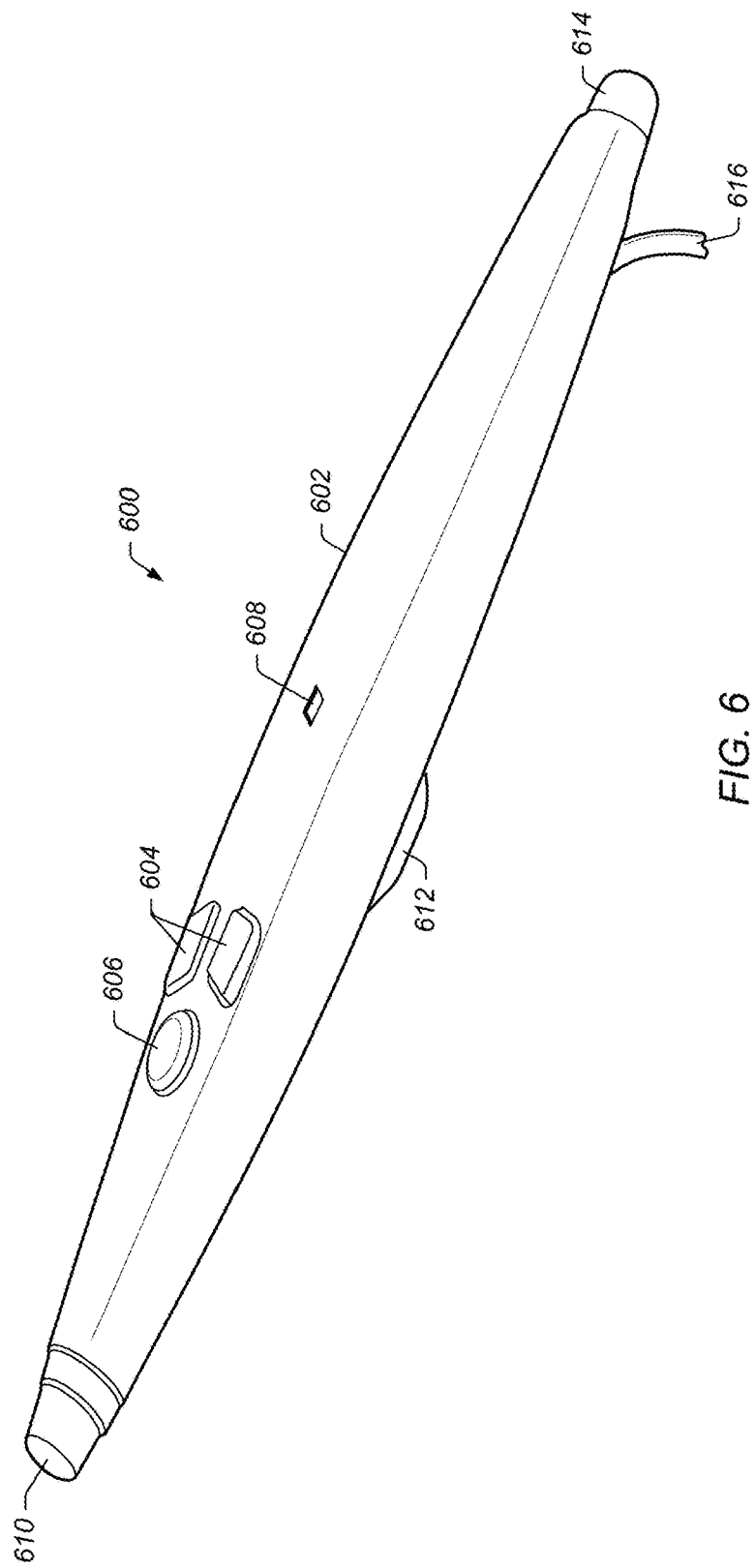
FIG. 6 illustrates an example of a user input device, according to some embodiments.

FIG. 6 illustrates an example of a user input device, according to some embodiments. As shown, a user input device 600 may be configured to perform various embodiments as described herein. User input device 600 may be similar to or the same as user input device 130 as described above in reference to FIGS. 4 and 5B-5C. Thus, user input device 600 may be used in conjunction with, or be included in, system 100 or systems 500 and 550. As described above, systems 100, 500, and 550 may have the capability to determine the six axis position and orientation of user input device 600. Note that this includes the X, Y, Z location of tip 610 of user input device 600 and the α, β, γ angular orientation of body 602 of user input device 600. However, it should be further noted that user input device 600 is exemplary, and that other user input devices, suitably configured, may be used as desired.

As shown, user input device 600 may include buttons 604, 606, and 612. One of the buttons, such as button 606, may be depressed and held down to trigger the selection of an object within a 3D scene presented by any of systems 100, 500, and 550. Additionally, system 100 may be configured to display a virtual "laser like" projection from tip 610 to the selected object. With the object selected, adjustment of the position and/or orientation of user input device 600 may change the position and/or orientation of the object. Thus, movements of the user input device 600 may result in corresponding translations and/or rotations of the object.

Integrating Real World Conditions into Displayed 3D Imagery

In some existing implementations, when using a conventional computer system, there is typically a complete (or near complete) separation between conditions of the real world (e.g., physical) environment in which a user and computer are located and imagery presented on a display of the computer. Thus, virtual world imagery, even when presented on a three-dimensional (3D) display, is separate and distinct from the real world environment in which the user and display are located. For example, assume a user sits at a desk in a darkened office. A first directional light located above and behind the user may illuminate a desktop on which there is a keyboard and a monitor. A second directional light overhead light may illuminate the user's face. The graphical image presented on the monitor is of a table top on which sits a reflective object such as a silver pitcher. In a conventional computer system, the lighting conditions in the virtual environment are determined entirely by choices made by the user, e.g., a reasonable lighting condition the user might choose for the virtual world might be uniform illumination. However, under the described real world conditions, there is clearly no connection between the real world conditions and the graphical representation in the virtual world. The disconnect between conditions may decrease any sense of realism that the user might perceive of the virtual image. In addition, the disconnect between conditions may also diminish the extent of any immersion in the virtual world that could be felt by the user.

Thus, embodiments described herein relate to enhancing realism of the virtual world. In other words, embodiments describe herein provide systems and techniques for integrating physical conditions into imagery presented by a three-dimensional (3D) system.

In some embodiments, a video camera or camera array (e.g., such as cameras 160 of system 100) may capture a portion of a physical environment in a video or sequence of images. The portion of physical environment may surround and include the user. In some embodiments, the capture of the portion of the physical environment may be continuous (e.g., a streaming video capture and/or a continuous sequence of images). The captured portion of the physical environment, or real world imagery.

This captured real world video imagery may then be continuously integrated into the virtual world graphical imagery and may be presented on a monitor (e.g., displays 150 or a display of client station 106) of a 3D display system (e.g., system 100, client station 106, and/or systems 500), affecting global, local, or reflected lighting conditions in a virtual world (e.g., a displayed 3D scene). In some embodiments, the integration process may include reconstructing a light map, a sparse light field, and or a depth map (e.g., from infrared images) from lighting data captured from the camera(s) (e.g., the array of cameras and/or video camera), e.g., based (at least in part) on knowledge of camera intrinsic and extrinsic (image capture) properties in the real world. In some embodiments, the integration process may include combining data captured via a virtual camera or head-tracked virtual camera with the reconstructed light map, sparse light field, and or depth map to generate a virtual light map/sparse light field which may then be displayed as part of a virtual world (e.g., a displayed 3D scene) using a real-to-virtual spatial relationship (e.g., a mapping between locations of objects in the real to world to objects in the virtual world). In some embodiments, the real world light map/sparse light field data/depth map may be blended (or combined) with pre-determined virtual lighting conditions and applied to a 3D rendering of a scene and virtual objects, for instance affecting virtually perceived reflected diffuse and/or specular light as well as surface textures. In some embodiments, the process may be repeated as time advances such that changes over time occurring in the real world environment are captured and integrated approximately (or substantially) immediately with displayed virtual content.

For example, in some embodiments, directional light illuminating a monitor (or display) may "continue on" and appear in a graphical image as an appropriately located and shaped illuminated spot on a table top where the monitor is positioned. In other words, in the implementation described above, instead of the user experiencing a disconnect between lighting in the physical (real) world and lighting in the virtual world, according to embodiments described herein, lighting in the virtual world may be adjusted based (at least in part) on data collected from the physical world such that the user does not experience a disconnect between the physical and virtual worlds. As another example, the silver pitcher described above, may reflect, using embodiments described herein, an appropriately distorted image of the illuminated face of the user. As a further example, a depth map based on infrared images may be used to determine surface textures which may then be rendered, using embodiments described herein, as part of the 3D scene. These examples are illustrated and further described below in reference to FIGS. 7A-B, 8A-B, 9A-B, and 10A-B.

Figure 7A:
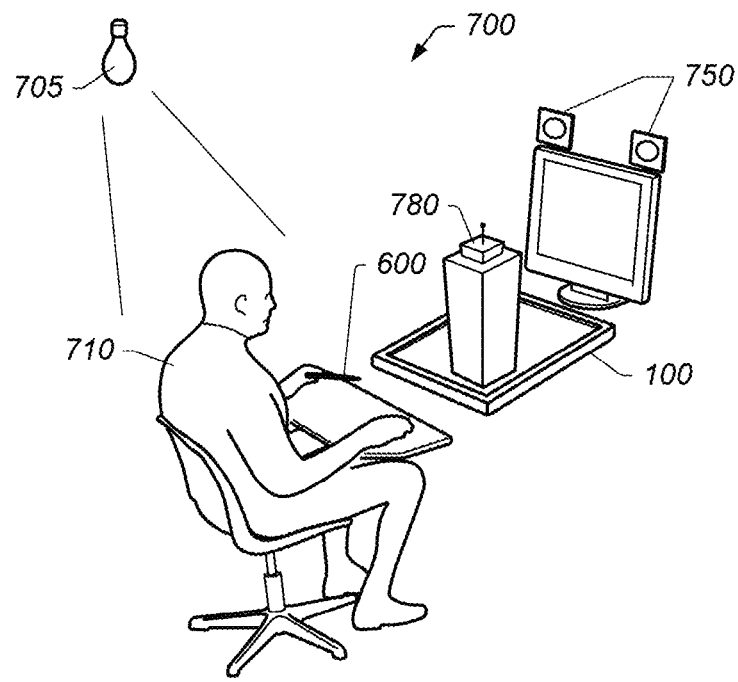
FIGS. 7A-7B illustrate an example of integrating lighting conditions of a physical location into a 3D scene, according to some embodiments.
Figure 7B:
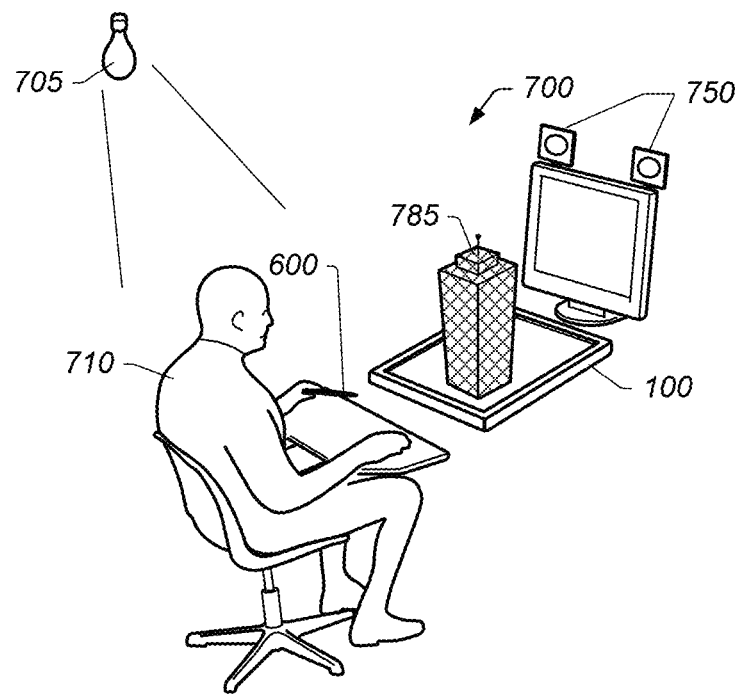

FIGS. 7A-7B illustrate an example of integrating lighting conditions of a physical location into a 3D scene, according to some embodiments. As shown in FIGS. 7A-7B, a user 710 of a 3D display system 100 (e.g., as described above), may view a 3D graphics object 780. In some embodiments, user 710 may interact with the 3D graphics object 780 via user input device 600 (e.g., as described above). In addition, the physical location 700 of the user may include light source 705. In some embodiments, cameras 750, which may be in communication with and/or included in, system 100, may capture images of the physical location of the user. In particular, cameras 750 may capture light and/or infrared images that may be used by system 100 to generate a data imagery map (e.g., a real world light map/sparse light field data/depth map) of the physical location 700, such that the data imagery map of the physical location 700 may be incorporated into 3D graphics object 780, thereby incorporating physical world conditions into virtual world imagery as shown by the 3D graphics object 785. As shown, 3D graphics object 785 incorporates the data imagery map of the physical location 700 into 3D graphics object 780. Note that the cameras 750 may capture images of the user as well as the physical location. In other words, the cameras 750 may be configured and positioned such that up to a 360-degree view of the physical location may be obtained. Thus, the cameras 750 may include cameras facing the user, facing away from the user, and/or facing in multiple directions to allow up to 360-degree capture of the physical location (or a portion of the physical location). Note that although the example has been described in reference to 3D display system 100, other 3D display systems, e.g., such as head-mounted 3D display systems 500A-C may also be configured to implement the example embodiment illustrated and described in referenced to FIGS. 7A-7B.

Figure 8A:
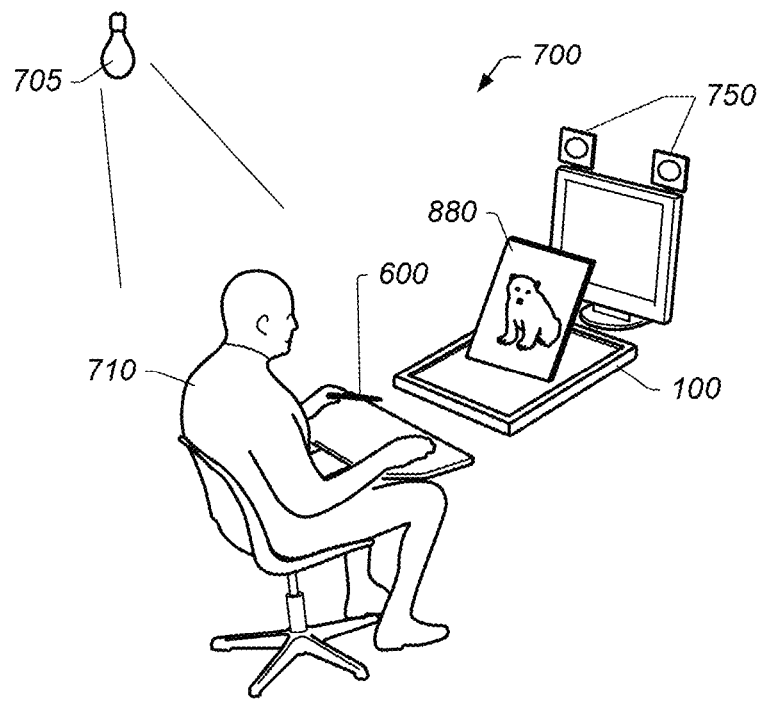
FIGS. 8A-8B illustrate an example of integrating an image of a user into a 3D scene, according to some embodiments.
Figure 8B:
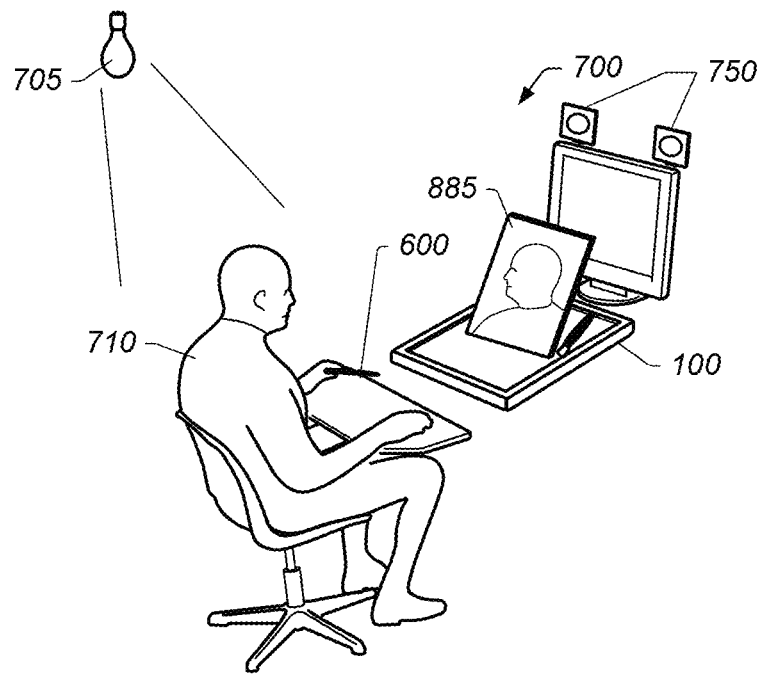

FIGS. 8A-8B illustrate an example of integrating an image of a user into a 3D scene, according to some embodiments. As shown in FIGS. 8A-8B, a user 710 of a 3D display system 100 (e.g., as described above), may view a 3D graphics object 880, e.g., a mirror displaying a virtual image. As described above, the physical location 700 of the user may include light source 705 and, in some embodiments, cameras 750 may capture images of the physical location of the user and/or of user 710. In particular, cameras 750 may capture light and/or infrared images that may be used by system 100 to generate a data imagery map (e.g., a real world light map/sparse light field data/depth map) of the physical location 700, such that the data imagery map of the physical location 700 may be incorporated into 3D graphics object 880, thereby incorporating physical world conditions into virtual world imagery as shown by the 3D graphics object 885. In some embodiments, as shown, 3D graphics object 885 incorporates the data imagery map of the physical location as well as an image of user 710 into 3D graphics object 880. Note that the cameras 750 may capture images of the user as well as the physical location. In other words, the cameras 750 may be configured and positioned such that up to a 360-degree view of the physical location may be obtained. Thus, the cameras 750 may include cameras facing the user, facing away from the user, and/or facing in multiple directions to allow up to 360-degree capture of the physical location (or a portion of the physical location). Note that although the example has been described in reference to 3D display system 100, other 3D display systems, e.g., such as head-mounted 3D display systems 500A-C may also be configured to implement the example embodiment illustrated and described in referenced to FIGS. 8A-8B.

Figure 9A:
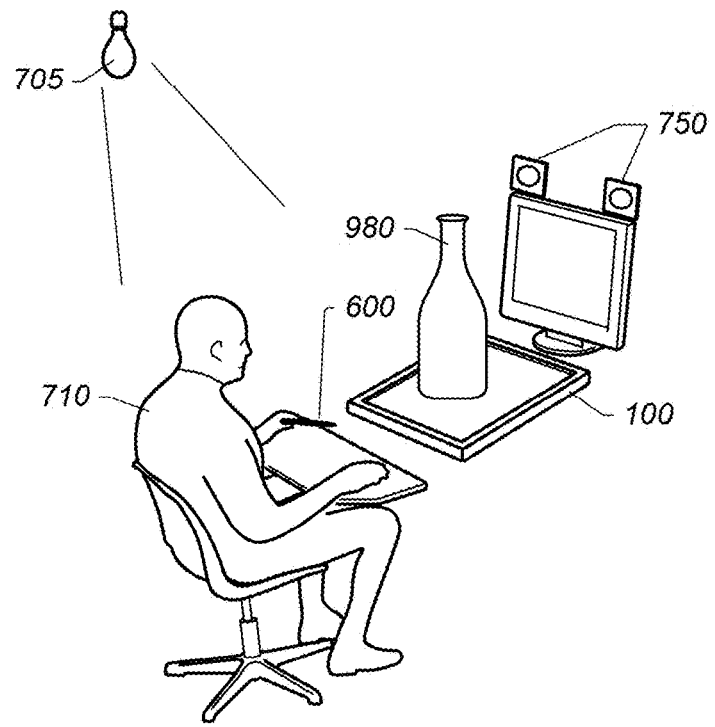
FIGS. 9A-9B illustrate an example of integrating a distorted image of a user into a 3D scene, according to some embodiments.
Figure 9B:
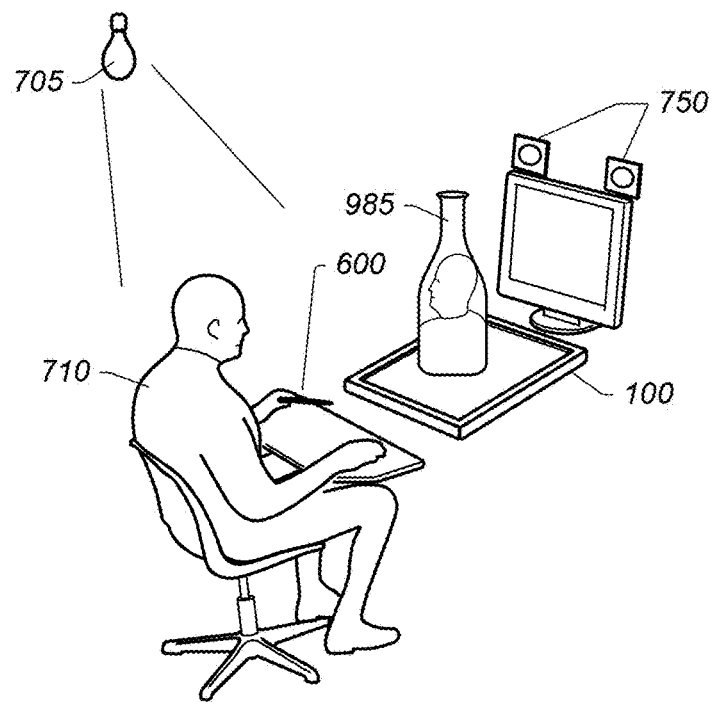

FIGS. 9A-9B illustrate an example of integrating a distorted image of a user into a 3D scene, according to some embodiments. As shown in FIGS. 9A-9B, a user 710 of a 3D display system 100 (e.g., as described above), may view a 3D graphics object 980, e.g., a reflective object, such as a silver vase. As described above, the physical location 700 of the user may include light source 705 and, in some embodiments, cameras 750 may capture images of the physical location of the user and/or of user 710. In particular, cameras 750 may capture light and/or infrared images that may be used by system 100 to generate a data imagery map (e.g., a real world light map/sparse light field data/depth map) of the physical location 700, such that the data imagery map of the physical location 700 may be incorporated into 3D graphics object 980, thereby incorporating physical world conditions into virtual world imagery as shown by the 3D graphics object 985. In some embodiments, as shown, 3D graphics object 985 incorporates the data imagery map of the physical location as well as an image of user 710 distorted as a reflection on the original 3D graphics object 980. Note that the cameras 750 may capture images of the user as well as the physical location. In other words, the cameras 750 may be configured and positioned such that up to a 360-degree view of the physical location may be obtained. Thus, the cameras 750 may include cameras facing the user, facing away from the user, and/or facing in multiple directions to allow up to 360-degree capture of the physical location (or a portion of the physical location). Note that although the example has been described in reference to 3D display system 100, other 3D display systems, e.g., such as head-mounted 3D display systems 500A-C may also be configured to implement the example embodiment illustrated and described in referenced to FIGS. 9A-9B.

Figure 10A:
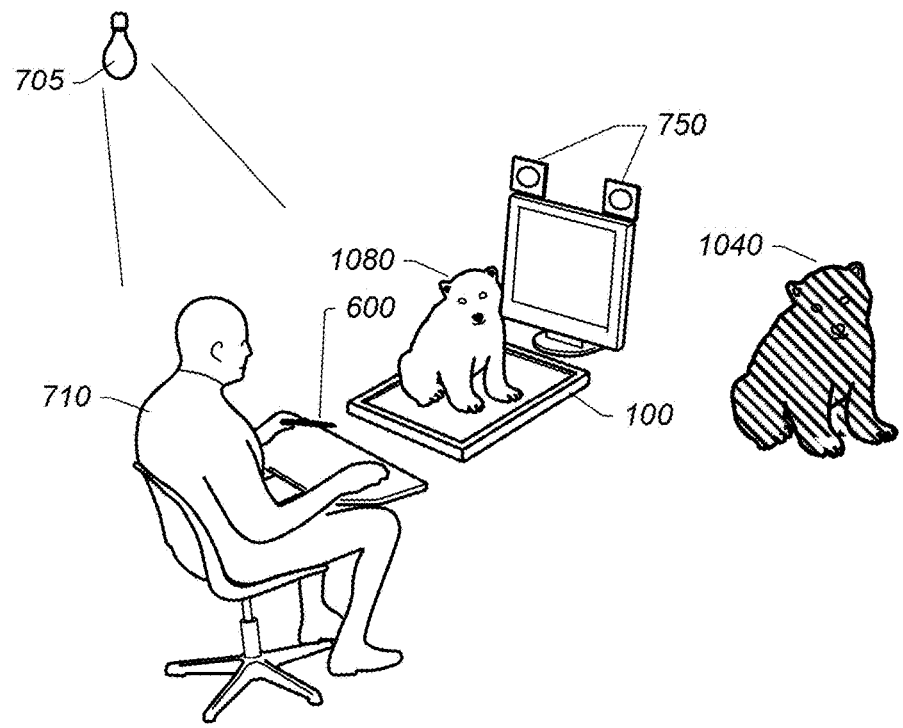
FIGS. 10A-10B illustrate an example of integrating textures of a physical object into a 3D scene, according to some embodiments.
Figure 10B:
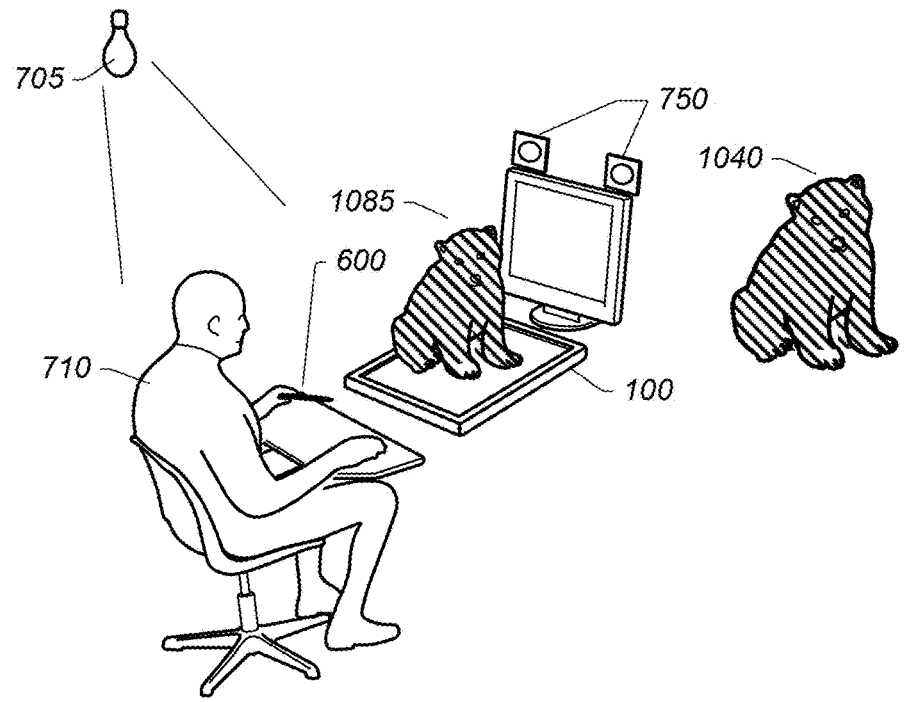

FIGS. 10A-10B illustrate an example of integrating textures of a physical object into a 3D scene, according to some embodiments. As shown in FIGS. 10A-10B, a user 710 of a 3D display system 100 (e.g., as described above), may view a 3D graphics object 1080, e.g., an object 1040 that may have been captured and integrated into the 3D scene as described above. As described above, the physical location 700 of the user may include light source 705 and, in some embodiments, cameras 750 may capture images of the physical location of the user and/or of user 710. In particular, cameras 750 may capture light and/or infrared images that may be used by system 100 to generate a data imagery map (e.g., a real world light map/sparse light field data/depth map) of the physical location 700, such that the data imagery map of the physical location 700 may be incorporated into 3D graphics object 1080, thereby incorporating physical world conditions into virtual world imagery as shown by the 3D graphics object 1085. In some embodiments, as shown, 3D graphics object 1085 incorporates the data imagery map of the physical location as well as textures of a physical object. Note that the cameras 750 may capture images of the user as well as the physical location. In other words, the cameras 750 may be configured and positioned such that up to a 360-degree view of the physical location may be obtained. Thus, the cameras 750 may include cameras facing the user, facing away from the user, and/or facing in multiple directions to allow up to 360-degree capture of the physical location (or a portion of the physical location). Note that although the example has been described in reference to 3D display system 100, other 3D display systems, e.g., such as head-mounted 3D display systems 500A-C may also be configured to implement the example embodiment illustrated and described in referenced to FIGS. 10A-10B.

Figure 11A:
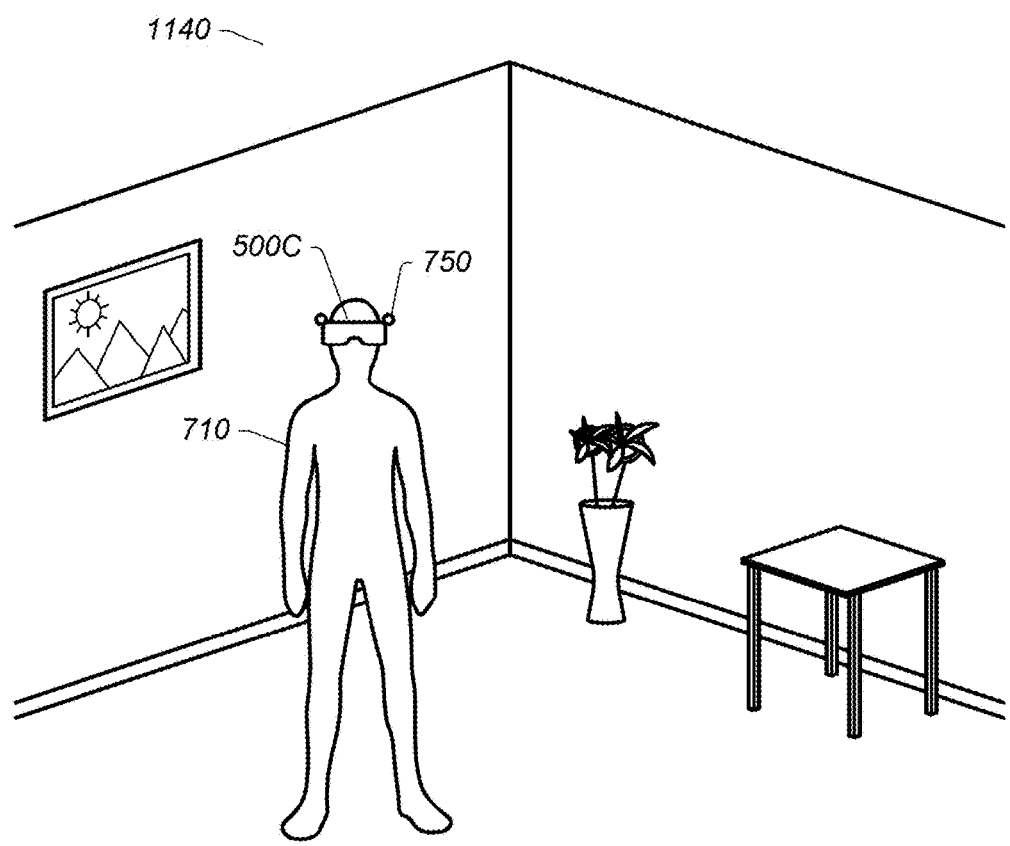
FIGS. 11A-11C illustrate an example of integrating real world physical location imagery into a virtual 3D scene on a head-mounted 3D display system, according to some embodiments.
Figure 11B:
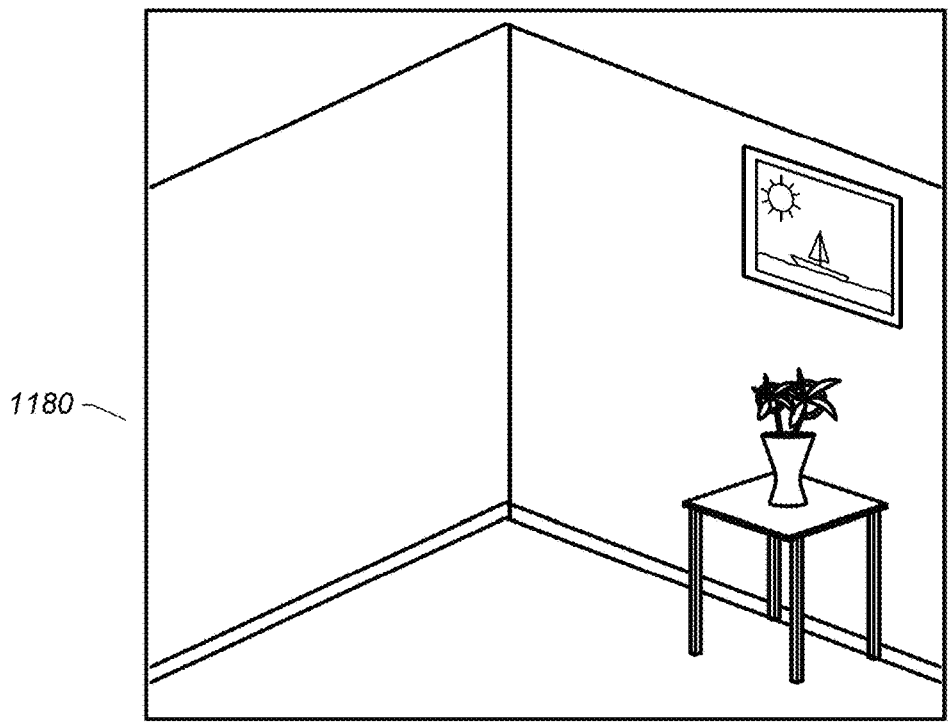
Figure 11C:
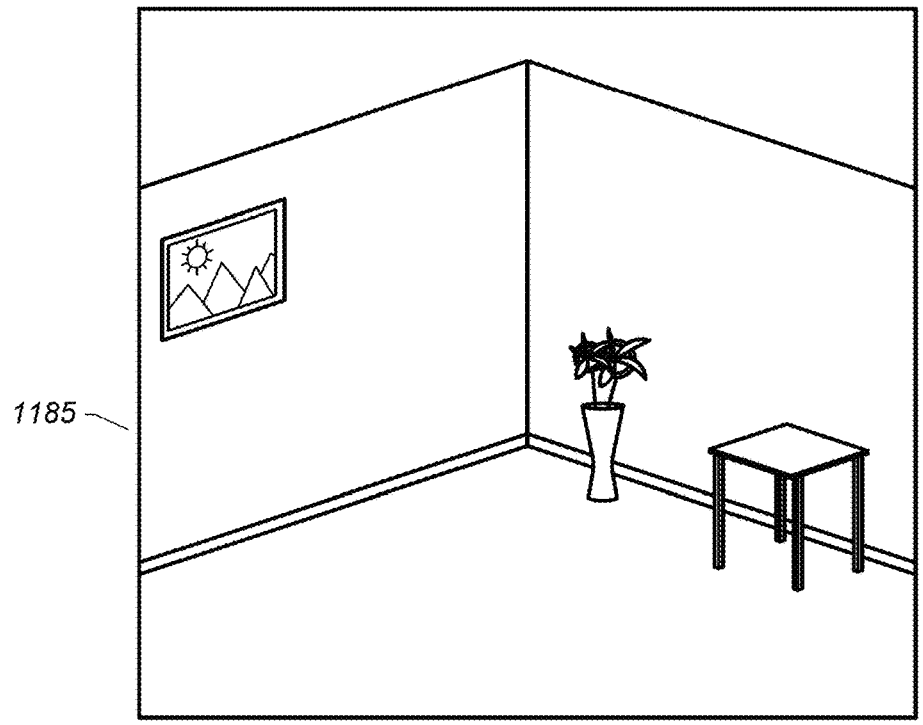

FIGS. 11A-11C illustrate an example of integrating real world physical location imagery into a virtual 3D scene on a head-mounted 3D display system, according to some embodiments. As shown in FIGS. 11A-11C, a user 710 of a head-mounted 3D display system 500C (e.g., as described above) may initially view a 3D scene 1180 as illustrated by FIG. 11B. The scene may include one or more graphics objects. The physical location 1100 of user 710 may include multiple objects, and, in some embodiments, cameras 750 (which may be coupled to or comprised in head-mounted 3D display system 500C) may capture images of the physical location 1100. In particular, cameras 750 may capture light and/or infrared images that may be used by system 500C to generate a data imagery map (e.g., a real world light map/sparse light field data/depth map) of the physical location 1100, such that the data imagery map of the physical location 1100 may be incorporated into 3D scene 1180, thereby incorporating physical world conditions into virtual world imagery as shown by the 3D scene 1185 in FIG. 11C. Note that the cameras 750 may be configured and positioned such that up to a 360-degree view of the physical location may be obtained. Thus, the cameras 750 may include cameras facing in multiple directions to allow up to 360-degree capture of the physical location (or a portion of the physical location).

Figure 12:
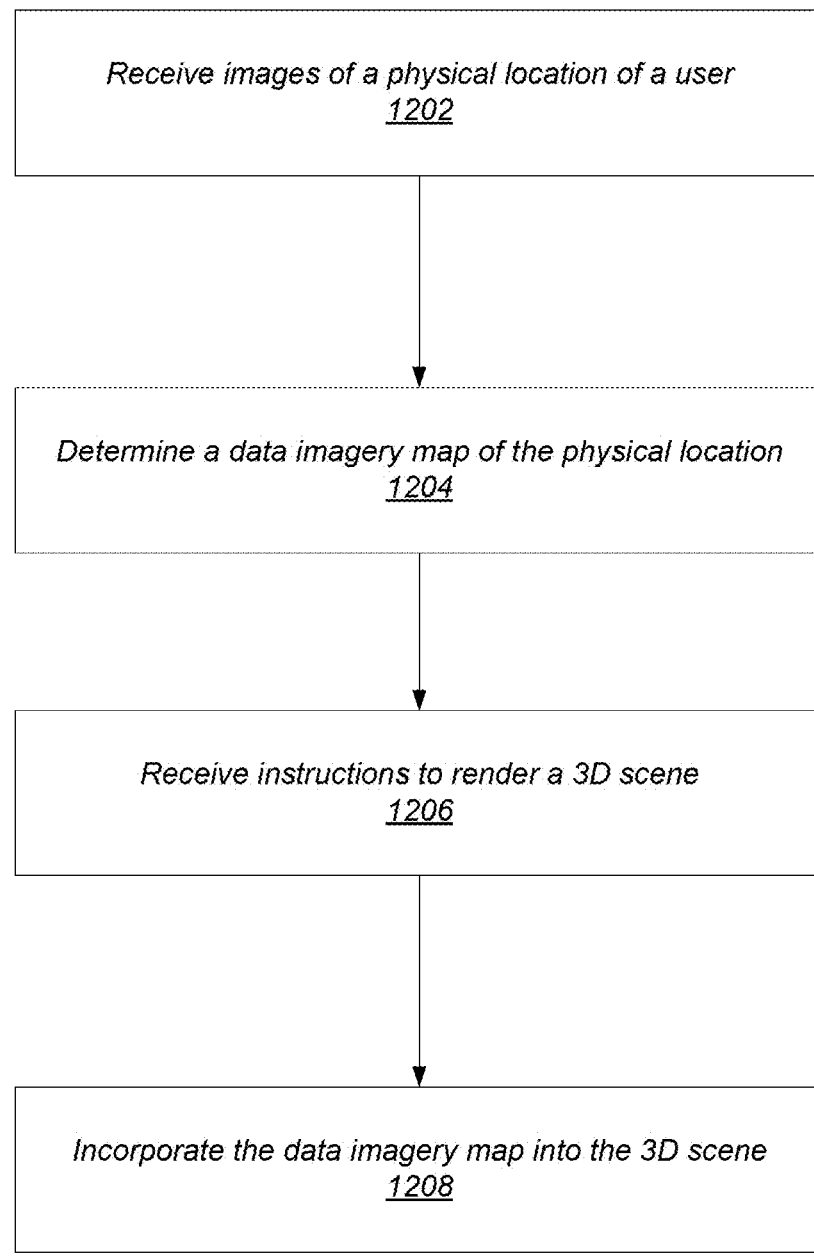
FIG. 12 illustrates a block diagram of an example of a method for integrating real world conditions into a rendered virtual world, according to some embodiments.

FIG. 12 illustrates a block diagram of an example of a method for integrating real world conditions into a rendered virtual world, according to some embodiments. The method shown in FIG. 12 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1202, images of a physical location (or a portion of a physical location) of a user of a three-dimensional (3D) display system (e.g., such as systems 120 and 500A-C described above) may be received. In some embodiments, the images may be received from a camera (or cameras). In some embodiments, the camera(s) may be video cameras. In some embodiments, the camera(s) may be an array of cameras. In some embodiments, the camera(s) may be included in the 3D display system. In other embodiments, the camera(s) may be a separate system in communication (e.g., wireless or wired) with the 3D display system. In some embodiments, the camera(s) (or camera array) may capture images of the user as well as the physical location. In other words, the camera(s) (or camera array) may be configured and positioned such that up to a 360-degree view of the physical location may be obtained. Thus, the camera(s) (or camera array) may include cameras facing the user, facing away from the user, and/or facing in multiple directions to allow up to 360-degree capture of the physical location (or a portion of the physical location).

In some embodiments, the camera(s) may be configured to capture any of light field type data, light images, and/or infrared images. In some embodiments, the infrared images may be useable to generate (or create) a depth map or depth image that may be combined with a light image (e.g., RGB (red-green-blue)) to place textures on surfaces of physical objects projected (or mapped/added) into a 3D scene (or virtual world).

In some embodiments, the images may include a sequence of images and/or may be a stream of images (e.g., a continuous stream of images). In some embodiments, the images of the physical location may include images of the user.

At 1204, a data imagery map of the physical location may be determined. In some embodiments, the data imagery map may be based (at least in part) on the one or more images. In some embodiments, the data imagery map may include a light map and/or infrared depth map of the physical location (or a portion of the physical location). In some embodiments, the data imagery map may include a sparse light field of the physical location (or a portion of the physical location).

At 1206, instructions to render a 3D scene may be received, e.g., from an application processor of the 3D display system. In some embodiments, the 3D scene may be rendered on a display of the 3D display system. In some embodiments, the 3D scene may include one or more 3D graphics objects, and the instructions may include rendering the one or more 3D graphics objects. In some embodiments, the 3D scene may be rendered based (at least in part) on a point of view of the user. In some embodiments, user position information (e.g., a 6 degree of freedom position of a user's head) may be received from a tracking sensor(s) and the point of view of the user may be determined based (at least in part) on the position information. In some embodiments, the tracking sensor(s) may be the camera(s) or video camera(s).

At 1208, the data imagery map may be incorporated into the 3D scene. In other words, the data imagery map may be incorporated such that physical world conditions captured in the images may be merged into virtual world imagery. In some embodiments, incorporating the data imagery map may be based (at least in part) on a point of view of the user. In some embodiments, the images of the physical location may include the user. In such embodiments, incorporating the data imagery map may include incorporating an image of the user into the virtual 3D scene (e.g., on a reflective surface rendered in the 3D scene). In some embodiments, the image of the user may be distorted based on a shape of a reflective surface rendered in the 3D scene. In some embodiments, incorporating the data imagery map may include incorporating textures on surfaces of physical objects.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium storing programming instructions executable by a processor to:
   receive, from at least one camera, one or more images of a physical environment of a user of a three-dimensional (3D) display system;
   determine a data imagery map of the physical environment based at least in part on the one or more images, wherein the one or more images of the physical environment of the user includes the user;
   receive instructions to render a virtual 3D scene on a display of the 3D display system; and
   incorporate the data imagery map of the physical environment, including a rendering of a reflection of the user on a 3D object within the 3D scene, into the virtual 3D scene, thereby incorporating physical world conditions into virtual world imagery.

2. The non-transitory computer readable memory medium of claim 1,
   wherein the data imagery map comprises a light map of the physical environment.

3. The non-transitory computer readable memory medium of claim 1,
   wherein the data imagery map comprises a sparse light field of the physical environment.

4. The non-transitory computer readable memory medium of claim 1,
   wherein the at least one camera comprises one or more video cameras.

5. The non-transitory computer readable memory medium of claim 1,
   wherein the at least one camera comprises an array of cameras.

6. The non-transitory computer readable memory medium of claim 1,
   wherein the program instructions are further executable to:
   receive user position information from one or more tracking sensors;
   determine a point of view of the user based in part of the position information; and
   wherein to incorporate the data imagery map, the program instructions are further executable to incorporate the data imagery map based at least in part on the point of view of the user.

7. The non-transitory computer readable memory medium of claim 1,
   wherein the one or more images comprises one or more sequences of images.

8. The non-transitory computer readable memory medium of claim 1,
   wherein the one or more images comprises a stream of video images.

9. The non-transitory computer readable memory medium of claim 1,
   wherein the rendering of the reflection of the user comprises rendering a distorted reflected image of the user.

10. The non-transitory computer readable memory medium of claim 1,
    wherein the one or more images provide a 360 degree view of the physical environment of the user, and wherein, to incorporate the data imagery map of the physical environment into the virtual 3D scene, the program instructions are further executable to incorporate the 360 degree view of the physical environment of the user into the virtual 3D scene.

11. The non-transitory computer readable memory medium of claim 1,
    wherein the real world condition associated with the physical environment of the user includes textures of physical objects, and wherein, to incorporate the data imagery map of the physical environment into the virtual 3D scene, the program instructions are further executable to render textures of the physical objects into the virtual 3D scene.

12. A three-dimensional (3D) display system comprising:
    a memory;
    at least one display; and
    at least one processor in communication with the memory and at least one display, wherein the at least one processor is configured to:
    receive, from at least one camera in communication with the processor, images of a physical environment of a user of the 3D display system, wherein the one or more images of the physical environment of the user includes the user;
    determine, based at least in part on the received images, a data imagery map of the physical environment, wherein the data imagery map captures physical world conditions associated with the physical environment of the user;
    generate instructions to render a virtual 3D scene on the at least one display; and
    incorporate the data imagery map, including a rendering of a reflection of the user on a 3D object within the 3D scene, into the virtual 3D scene, thereby incorporating the physical world conditions into virtual world imagery.

13. The 3D display system of claim 12,
    wherein the data imagery map comprises one of:
    a light map of the physical environment;
    a sparse light field of the physical environment; or
    a depth map of the physical environment.

14. The 3D display system of claim 12,
    wherein the at least one camera comprises one of:
    one or more video cameras; or
    an array of cameras.

15. The 3D display system of claim 12,
    wherein the processor is further configured to:
    receive user position information from one or more tracking sensors;
    determine a point of view of the user based in part of the position information; and
    wherein to incorporate the data imagery map, the processor is further configured to incorporate the data imagery map based at least in part on the point of view of the user.

16. The 3D display system of claim 15,
    wherein the system further comprises the one or more tracking sensors, wherein the one or more tracking sensors are in communication with the processor.

17. The 3D display system of claim 12,
wherein the one or more images comprises:
   one or more sequences of images; or
   a stream of video images.

18. The 3D display system of claim 12,
wherein the rendering of the reflection of the user comprises rendering a distorted reflected image of the user.

19. A method for incorporating real world conditions into a three-dimensional (3D) graphics object, the method comprising:
   receiving, from at least one camera, images of a physical environment of a user of a three-dimensional (3D) display system, wherein the images of the physical environment of the user includes the user;
   determining, based at least in part on the received images, a data imagery map of the physical environment, wherein the data imagery map captures real world conditions associated with the physical environment of the user;
   generating instructions to render a 3D graphics object; and
   incorporating the data imagery map, including a rendering of a reflection of the user on a 3D object within the 3D scene, into a virtual 3D scene comprising the 3D graphics object, thereby incorporating the real world conditions into virtual world imagery.

20. The method of claim 19,
wherein the data imagery map comprises one of:
   a light map of the physical environment;
   a sparse light field of the physical environment; or
   a depth map of the physical environment.

* * * * *